United States Patent [19]

Kapiloff et al.

[11] Patent Number: 4,460,472
[45] Date of Patent: Jul. 17, 1984

[54] SCALE INHIBITOR FOR REVERSE OSMOSIS WATER PURIFICATION SYSTEM

[75] Inventors: Anita G. Kapiloff, Treasure Island, Fla.; Randolph T. Hatch, Silver Spring, Md.

[73] Assignee: The B. F. Goodrich Company, Akron, Ohio

[21] Appl. No.: 467,867

[22] Filed: Feb. 18, 1983

Related U.S. Application Data

[62] Division of Ser. No. 222,760, Jan. 6, 1981, Pat. No. 4,386,005.

[51] Int. Cl.³ .............................................. C02F 5/14
[52] U.S. Cl. .................................... 210/639; 210/652; 210/699; 210/701; 252/180
[58] Field of Search ............... 210/698, 699, 701, 639, 210/652; 252/180, 181

[56] References Cited

U.S. PATENT DOCUMENTS

| | | | |
|---|---|---|---|
| 2,497,062 | 2/1950 | Artz | 210/698 |
| 2,626,238 | 1/1953 | Artz | 210/698 |
| 3,502,587 | 3/1970 | Stanford et al. | 252/180 |
| 3,549,548 | 12/1970 | Newman | 252/181 |
| 3,589,998 | 6/1971 | Rice et al. | 210/701 |
| 3,890,228 | 6/1975 | Hwa et al. | 252/180 |
| 4,357,254 | 11/1982 | Kapiloff et al. | 252/181 |

OTHER PUBLICATIONS

Nancollas, "The Nucleation Growth & Dissolution of Crystals of Scale Forming Minerals," NSF, Prop. No., 67850540, 1-31-1978.

Technical Bulletin, DuPont Company, "Pretreatment Guidelines for Sea Water & Other High Salinity Feeds," No. 440, 4-6-1977.

Technical Bulletin, DuPont Company, "Prevention of $CaCO_3$ & $SO_4$ Scaling of B-9 Permeator," No. 410, 9-1-1977.

Technical Bulletin, DuPont Company, Pretreatment Considerations for Reverse Osmosis, No. 401, 9-1-1977.

*Primary Examiner*—Peter A. Hruskoci
*Attorney, Agent, or Firm*—Cantor and Lessler

[57] ABSTRACT

A method for inhibiting scale build up in reverse osmosis water purification system is disclosed. The method uses a composition composed of low molecular weight polyacrylic and phytic acid in a synergistic combination and significantly reduces build up of calcium, magnesium, and/or iron scale.

8 Claims, 2 Drawing Figures

SCALE INHIBITOR FOR REVERSE OSMOSIS WATER PURIFICATION SYSTEM

CROSS-REFERENCE TO RELATED APPLICATION

This application is a divisional of copending application Ser. No. 222,760, filed Jan. 6, 1981, now U.S. Pat. No. 4,386,005, granted May 31, 1983.

BACKGROUND OF THE INVENTION

This invention relates to water purification and, more particularly, this invention relates to reverse osmosis systems for water purification. Specifically, this invention is concerned with a method and composition for inhibiting scale in reverse osmosis water purification systems.

One of the most abundant natural resources on this planet, earth yet, paradoxically, one of the scarcest natural resources, is water. While fully seventy-five percent (75%) of the surface of the planet is water, actually very little of it is available for use by man without further treatment since most of it is saline or brackish. Furthermore, the distribution of water, especially potable water, on the planet is such that many inhabited areas are not blessed with an abundance of potable water. Thus, there is a need for purifying saline or brackish water to obtain potable water in many parts of the world.

There are other, man-made, environments wherein there is a great need for efficient and relatively inexpensive means for purifying saline or brackish water. For example, off shore drilling rigs are literally surrounded by water, none of it fit to drink and transporting water to such locations by tanker is prohibitive in cost. One of the most efficient means devised for providing fresh water for such environments is reverse osmosis water purification systems.

The principle of reverse osmosis has been known for many years. In its simplest form, osmosis utilizes a membrane which is semi-permeable to water but which rejects certain dissolved salts. Under normal conditions, if pure water is separated from a salt solution by a semi-permeable membrane, the water will flow through the membrane from the pure water side to the impure water side that is, from a dilute solution to a more concentrated solution, thereby diluting the more concentrated solution and continuing until osmotic equilibrium is reached. Osmotic equilibrium is reached when the osmotic head equals the osmotic pressure of the salt solution. It is well-known, however, that if a positive pressure is applied to the salt solution in an amount sufficient to overcome the osmotic pressure, the flow will be reversed and water will flow from the salt solution through the membrane to the pure water side of the membrane. Hence the term reverse osmosis.

In a reverse osmosis water purification system, impure water is pumped under high pressure into the system where it contacts the semi-permeable membrane. The product water which is 95-99% free of dissolved minerals emerges from the membrane and passes out of the apparatus. Since the output of a reverse osmosis purification system relies to a great extent on the surface area of the membrane, there have been many developments in the improvement of systems which maximize the membrane area while packaging the membrane in a minimum of space. A typical structure used in making a reverse osmosis water purification device is shown in an oversimplified form partially schematically and partially in cross-section in FIG. 1. The structure, generally designated by the numeral 10, comprises membrane 12 supported on a cellular polymer matrix 14 which, in turn, is supported on a central foraminous support 16. The foraminous support, or screen, 16 essentially acts as a spacer as well as providing some mechanical support. Spongy polymer matrix 14 is any suitable open-celled foam material which will provide some mechanical support as well as providing free passage for the water. The membrane 12 is a thin, somewhat delicate, semi-permeable membrane made of any suitable material such as cellulose acetate, cellulose triacetate, a polyimide, or a polysulfone. If this structure is surrounded by saline water under pressure, at a pressure typically 600 to 800 psi, the water will pass through the membrane, travel through the polymer matrix, and then through the screen and emerge at the outlet 18 at one end of the structure. Essentially, the water follows the path designated by the arrows in FIG. 1. The membrane rejects the dissolved mineral salts. The end opposite the outlet 18 is closed.

Considering the structure shown in FIG. 1, it is clear that a structure large enough to provide a commercially usable flow of potable water will be extremely large and impractical. Thus, this structure, for use in modern equipment, is spirally wound in jelly-roll fashion and inserted in a rigid casing to provide a replaceable cartridge for the equipment. The water enters the cartridge through an inlet and flows through the spiral windings, with water passing through the membrane throughout the cartridge and emerging through a pipe at the center of the spiral. The now concentrated saline water passes out through an outlet.

It is to be distinctly understood that this invention is not at all related to the reverse osmosis water purification equipment, this brief simplified description of the typical apparatus being presented only for the purpose of understanding the system with which we are concerned and the problems which are to be solved.

Continuing with a description of the background of the invention, a typical water purification system based on reverse osmosis is shown schematically in FIG. 2. The impure water enters the pump 20 at 22. Certain chemical additives whose purpose will be described later are injected into the impure water flow at 24 and are thoroughly mixed in the impure water by a mixer 26. The water passes through filter 28 to remove solid impurities and then through booster pump 30 to a cartridge filter 32 where smaller solid impurities are removed. The water is then pumped by pressure pump 34 to the reverse osmosis apparatus 36. The water which passes through the reverse osmosis membrane in a cartridge passes out of apparatus 36 at outlet 38. Disinfectant is added at 40 and the final product passes out of the system at 42. The concentrated brine emerges from the system at 44.

The continued efficiency of a reverse osmosis system depends on the maintenance of the membrane in an unfouled condition. Probably the greatest problem experienced in the use of these systems is fouling of the membrane by scale. Typically, the membrane becomes fouled by scale build up to a point where it must be replaced quite often, sometimes as often as several times a month. The cartridge must then be removed and replaced by a clean cartridge. The used cartridge is then treated to remove scale. Obviously, it is desirable to prevent scale build-up, or, at least, prolong the time between cartridge changes. This is ordinarily done by injecting certain chemical additives to the impure water, these additives being used for the purpose of preventing the build-up of scale.

In the prior art, "scale" generally refers to calcium and magnesium scale.

There are a number of known additives for preventing scale build-up. Hexametaphosphate is widely used, as is sulfuric acid, in an amount sufficient to lower the pH to about 4-5. Without going into great detail in describing the mechanism of the prevention of scale build-up, it is known that hexametaphosphate prevents the growth of a precipitate of calcium magnesium oxide hydroxide. Sulfuric acid raises the solubility of calcium and magnesium salts thereby resulting in less of a precipitate. Both of these prior art additives retard scale build-up but do not stop it altogether. It is still necessary to remove the membrane and clean it at least once a month.

Another material commonly used as a scale inhibitor is a composition of polyacrylic acid having a molecular weight of about 20,000, chlorine, and calcium hypochlorite. The chlorine and calcium hypochlorite are to inhibit microbial growth. The major disadvantage of this composition is that the chlorine damages certain membranes to the point where they must be replaced and discarded.

The use of polyacrylic acid having a molecular weight in the range of about 20,000 to 22,000 is known in the prior art as a scale inhibitor. But, it is still quite inefficient.

Still other materials for use as scale inhibitors have been investigated, but have not found wide acceptance due to cost or other factors. For instance, in a proposal made by George H. Nancollas of the State University of New York at Buffalo to the National Science Foundation (proposal No. 67850540), polyphosphates, polycarboxylates, and polyphosphonates were described as well as low molecular weight polyacrylates. While the proposal does not specify the molecular weight of the polyacrylates, a material known as Calnox 214DM is the material used.

The work done by Nancollas was concerned with scale in heat exchange systems and the like and was not concerned in any way with reverse osmosis water purification systems. The tests were all run under laboratory conditions using artificially constituted solutions of calcium sulfate dihydrate. Magnesium salts were also considered. Other materials tested were diethylenetriaminepenta-(methylene phosphonic acid) and phytic acid. There was also the suggestion that synergistic mixtures of phytic acid and phosphonates or phytic acid and diethylenetriaminepenta-(methylene phosphonic acid) could be used.

The work done by Nancollas, however, is not at all concerned with reverse osmosis systems and, in fact, there is no suggestion that his work could be extrapolated for use with reverse osmosis systems.

Furthermore, none of the prior art known to us mentions or even suggests iron scale as a problem with reverse osmosis systems. We have found, however, that iron scale is as great a problem as calcium and magnesium scale and, perhaps, an even greater problem.

The reason for this is that calcium and magnesium scale tend to grow on the membrane from which they must be removed. While they are ordinarily removed chemically, it is essentially a mechanical removal. On the other hand, iron tends to grow crystals *in* the membrane which not only clogs the pores but, as the crystals grow, causes actual physical damage to the membrane. Thus, the cleaning of the membrane of iron scale is more complex and delicate and must be done before the crystals grow large enough to damage the membrane. We have found that none of the known scale inhibitors are at all effective for the prevention of iron scale.

BRIEF DESCRIPTION OF THE INVENTION

We have found that the most efficient inhibitor of the build up of calcium and magnesium scale is low molecular weight polyacrylic acid. By low molecular weight is meant a molecular weight from about 1,000 to about 10,000. A preferred range is from about 1,000 to about 8,000 and a more preferred range is from about 1,000 to about 2,000. When low molecular weight polyacrylic acid is used alone, calcium and magnesium scale are inhibited to a point where removal and cleaning of the membrane is not necessary for a period of several months.

Similarly, we have found that phytic acid is at least as efficient as low molecular weight polyacrylic acid for inhibiting calcium and magnesium scale build up on reverse osmosis membranes. As has been pointed out, phytic acid has been suggested for use in the prevention of precipitation of calcium sulfate dihydrate, but it has not been suggested for inhibiting the scale build up on a reverse osmosis membrane.

We have further found, quite unexpectedly, that phytic acid is extremely effective in inhibiting iron scale on a reverse osmosis membrane when used in actual field conditions where the feed water is saline or brackfish. It is pointed out that most saline water has a low concentration of iron but brackfish water has an extremely high iron concentration.

In addition, we have found, quite unexpectedly, when low molecular weight polyacrylic acid and phytic acid are combined, a synergistic effect is obtained whereby the composition of the two ingredients not only inhibits the growth of calcium and magnesium scale on a reverse osmosis membrane, it inhibits the growth of iron scale, and the total amount of inhibitor needed to achieve the desired result is decreased by an amount more than would be expected from the mere additive effect of the two ingredients. For example, if one part of either low molecular weight polyacrylic acid or phytic acid would ordinarily be needed to inhibit the calcium and magnesium scale in a given volume of water having a given hardness, when both are used together, only one quarter part of each is necessary to provide the same inhibition of scale using the same feed water. Using this composition, in an amount to provide from 0.01 to 20 ppm of each of the low molecular weight polyacrylic acid and phytic acid in the feed water, a cartridge containing the membrane need only be removed for cleaning every 3 to 12 months. The economic advantage of this saving is obvious to one skilled in the art considering the cost of the cartridge, the down time of the unit when the cartridge is being replaced, and the transportation costs of carrying the cartridge from an off-shore drilling rig to the mainland.

As used with reference to the instant invention, that is, in the remainder of this specification and the appended claims, "scale" refers to calcium scale, magnesium scale, and/or iron scale.

It is a primary object of the present invention to provide a method for inhibiting scale in a reverse osmosis water purification system which is free of the aforementioned and other such disadvantages.

It is another object of the present invention to provide a method for inhibiting scale in a reverse osmosis water purification system which is simple and easy to perform in the field and utilizes a synergistic combination of ingredients.

Consistent with the foregoing objects, a composition is provided according to the present invention which inhibits scale in a reverse osmosis water purification system, the composition consisting essentially of a combination of polyacrylic acid having a molecular weight of from 1,000 to about 10,000 and phytic acid. The preferred molecular weight of the polyacrylic acid is from 1,000 to 8,000 and the more preferred molecular weight range is from 1,000 to 2,000. The composition suitably consists essentially of from 1 to 0.05 part by weight of the polyacrylic acid and from 0.05 to 1 part by weight of the phytic acid. The preferred composition is a concentrate consisting essentially of 1 part by weight of polyacrylic acid and 0.05 part by weight of phytic acid. This concentrate is then diluted for use such that from 0.01 to 20 ppm of each of the two ingredients will be present in the feed water flowing under pressure to the reverse osmosis water purification system.

In the preferred method, the concentrate is diluted with water to form a stock solution having an intermediate dilution and then the stock solution is injected into the infeed water to provide the concentration of from 0.01 to 20 ppm of each of the two ingredients.

BRIEF DESCRIPTION OF THE DRAWING

The foregoing objects will be explained, and other objects and advantages will become apparent from a consideration of the following detailed description and the appended drawings wherein.

DETAILED DESCRIPTION OF THE PREFERRED EMBODIMENTS

Figure 1:
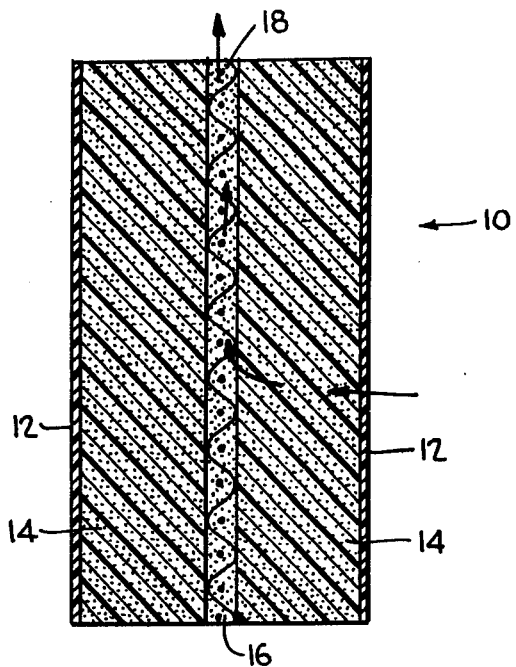
FIG. 1 is a cross-sectional view, partially schematically shown, of a typical prior art reverse osmosis membrane assembly.
Figure 2:
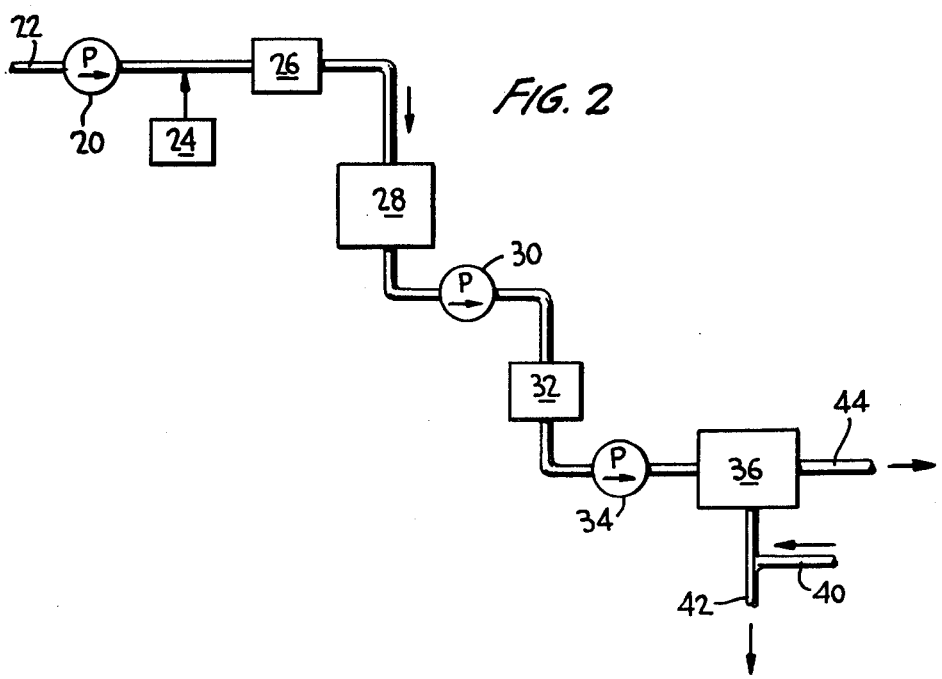
FIG. 2 is a schematic of a typical prior art reverse osmosis water purification system.

As discussed above, in practicing the present invention, the infeed water to the purification system should contain from 0.01 to 20 ppm of a low molecular weight polyacrylic acid and from 0.01 to 20 ppm of phytic acid. Considering the solubities of these ingredients and the necessity for operation of a reverse osmosis water purification system in the field under often rigorous conditions and with equipment of relatively low precision, it is not practicable to inject the polyacrylic acid and phytic acid directly into the infeed water without diluting them first. On the other hand, it is uneconomical to ship the concentrate in a diluted or semi-diluted form simply because shipping costs are based on weight and it is expensive to ship water. The composition is, therefore, most efficiently manufactured and shipped in a concentrated liquid form and diluted in the field to form a stock solution which is, in turn, injected into the infeed water stream to achieve the final dilution.

It is pointed out, incidentally, that the ingredients of this composition are both biodegradable and environmentally safe.

The low molecular weight polyacrylic acid used by us is commercially sold as "Syntergent JF" by Diamond Shamrock. Syntergent JF is a syrupy, liquid consisting of a solution of polyacrylic acid having a molecular weight of from 1,000 to 2,000 in water, the solution being approximately 50% by weight of the polyacrylic acid. The phytic acid is available commercially in food grade as well as other grades which could also be satisfactorily used.

EXAMPLE 1

The composition was prepared by dissolving one pound of phytic acid in 39 pounds of Syntergent JF under stirring until the phytic acid dissolved (about 8 hours) at room temperature. The final composition weighed 40 pounds and had a solids content of 21 pounds, of which 20 pounds was polyacrylic acid and 1 pound was phytic acid. The density of the solution was approximately 9 pounds per gallon.

The concentrate made according to example 1 is shipped to the site of the reverse osmosis water purification system for use. In ordinary use, depending on the precise mineral composition of the water being treated, the concentrate is conveniently diluted to form a stock solution and the stock solution is then injected into the infeed water stream to achieve the desired final concentration of the ingredients.

EXAMPLE 2

In a particular installation, a water purification system on an offshore drilling rig off the Texas Gulf Coast, the concentrate was diluted at the rate of 1 gallon of concentrate to 200 gallons of water in a feed tank to form the stock solution. It will be apparent to those skilled in the art that the water used for this dilution would be the feed water and need not be purified water.

The stock solution from the feed tank was then injected into the flowing infeed water to the purification system at the rate of 1 gallon per 600 gallons of feed water. This provided a final concentration of the instant composition of 4.71 ppm, that is, 4.71 ppm of the combination of polyacrylic acid and phytic acid. Thus, since the weight ratio of the polyacrylic acid to phytic acid was 1 to 0.05, the final concentration was about 0.2242 ppm of phytic acid and about 4.480 ppm of polyacrylic acid.

By injecting this composition into the infeed water, the scale build up was significantly reduced to the point where replacement of the membrane cartridge was not necessary for over 6 months.

The composition and method of the present invention are effective when the pH of the water being treated is on the acid side of neutral, the preferred pH range being from about 5 to just below 7. Since most impure water is slightly acid, usually no adjustment is necessary. If an adjustment is needed, enough sulfuric acid is added to bring the pH to within the desired range. It has been found that the amount of sulfuric acid needed to adjust the pH of a particular water to a given value is lower when the instant composition is present than when either polyacrylic acid or phytic acid alone is used. When a pH adjustment is necessary, the sulfuric acid is injected into the feed water with, or immediately after, the inhibitor.

EXAMPLE 3

A stock solution was made up as in Example 2 and the stock solution was injected into the infeed water at a constant rate of about 67 gallons per day. The feed rate of the infeed water was monitored and adjusted to provide about 3,000 gallons of fresh water per day. Considering about a 20% recovery rate for the unit being used, there was a flow of about 15,000 gallons of feed water per day. Thus, about ⅛ gallon of concentrate was used per 15,000 gallons of infeed water.

Use of the present composition was begun in February 1980 and, as of the date of filing of the parent application, replacement of the membrane cartridge still wasn't necessary.

Thus, it will be appreciated that the objects set forth at the outset have been successfully achieved. Those skilled in the art will appreciate that this invention, although described by reference to the presently preferred embodiments thereof, can be otherwise variously practiced within the scope of the following claims which, alone, define the instant invention.

What is claimed is:

1. A method of inhibiting the growth of scale in a reverse osmosis water purification system comprising injecting into the infeed water of said reverse osmosis water purification system a sufficient amount of a composition consisting essentially of from 1 to 0.05 part by weight of polyacrylic acid having a molecular weight of from 1,000 to about 10,000 and from 0.05 to 1 part by weight of phytic acid to inhibit the growth of scale in said reverse osmosis water purification system.

2. A method as claimed in claim 1, wherein said composition is injected in an amount sufficient to provide from 0.01 to 20 ppm, of each of said polyacrylic acid and said phytic acid.

3. A method as claimed in claim 1, wherein said composition consists essentially of 1 part by weight of said polyacrylic acid and 0.05 part by weight of said phytic acid.

4. A method as claimed in claim 1, wherein said polyacrylic acid has a molecular weight of from 1,000 to 8,000.

5. A method as claimed in claim 4, wherein said polyacrylic acid has a molecular weight of from 1,000 to 2,000.

6. A method as claimed in claim 1, comprising the steps of diluting said composition with water to form a stock solution having an intermediate dilution and then injecting said stock solution to said infeed water to provide from 0.01 to 20 ppm of each of said polyacrylic acid and said phytic acid.

7. A method as claimed in claim 6, wherein said composition consists essentially of a mixture of 1 part by weight of said polyacrylic acid and 0.05 part by weight of said phytic acid in 0.95 part by weight of water, said mixture weighing about 9 pounds per gallon, said stock solution is formed by diluting 1 gallon of said composition with 200 gallons of water, and said mixture is injected into said infeed water at the rate of 1 gallon of stock solution per 600 gallons of infeed water.

8. A method as claimed in claim 1, wherein said composition consists essentially of equal amounts by weight of said polyacrylic acid and said phytic acid.

* * * * *